Dec. 23, 1958     F. D. MILLER     2,865,402
MULTIPORT DIAPHRAGM VALVE
Filed June 22, 1955     3 Sheets-Sheet 1
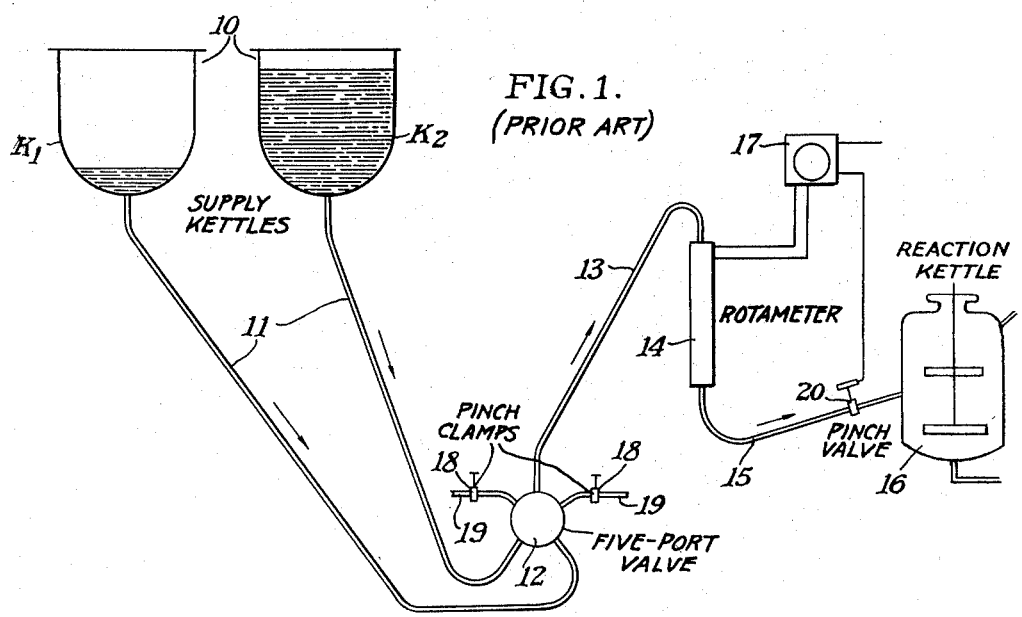
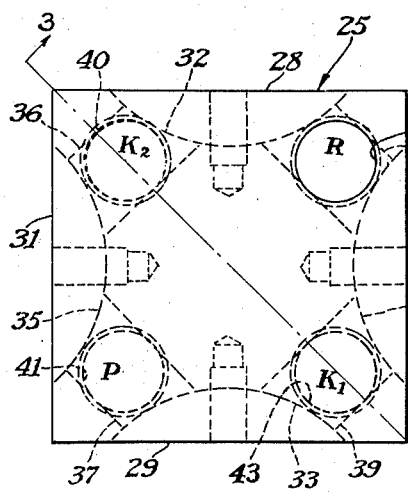
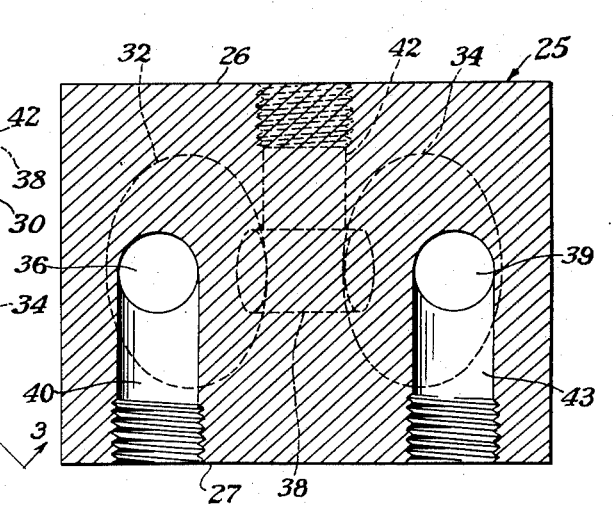
FRANK D. MILLER
INVENTOR.

Dec. 23, 1958   F. D. MILLER   2,865,402
MULTIPORT DIAPHRAGM VALVE
Filed June 22, 1955   3 Sheets-Sheet 2

FRANK D. MILLER
INVENTOR.

BY
ATTORNEYS

Dec. 23, 1958 F. D. MILLER 2,865,402
MULTIPORT DIAPHRAGM VALVE
Filed June 22, 1955 3 Sheets-Sheet 3

FRANK D. MILLER
INVENTOR.
BY Daniel L. Mayne,
J. Griffin Little
ATTORNEYS

United States Patent Office 2,865,402
Patented Dec. 23, 1958

2,865,402

MULTIPORT DIAPHRAGM VALVE

Frank D. Miller, Rochester, N. Y., assignor to Eastman Kodak Company, Rochester, N. Y., a corporation of New Jersey Application June 22, 1955, Serial No. 517,132

4 Claims. (Cl. 137—637.1)

This invention relates to valves, and more particularly to multiport-diaphragm type valves for controlling the flow of a liquid from a plurality of sources to a single point of disposal, or, conversely, from a single source to one or more of a plurality of points of disposal.

This invention has as its principal object the provision of a new and improved multi-diaphragm control valve.

Another object of the invention is the provision of such a valve which enables changing from one source of liquid to another without interruption in the liquid flow or variation in the rate of flow.

Yet another object of the invention is the provision of a control valve which permits a change from one source of supply to another to be made in such a way that the supply from one liquid source is blended with that from another so that no abrupt change in supply from one kettle to the other occurs.

Still another object of the invention is the provision of a control valve which is cheap to build, cleaner, easy to maintain, and more compact than existing valves.

Also the valve of the present invention may be made of transparent material such as plastic so that the operation of the valve can be viewed by the operator.

To these and other ends, the inventive idea resides in certain improvements and combinations of parts, all as will be hereinafter more fully described, the novel features being pointed out in the claims at the end of the specification.

In the drawings:

Fig. 1 is a diagrammatic view of the liquid supply equipment for a chemical process showing the relation thereto of the type of control valve used prior to the present invention;

Fig. 2 is a plan view of a control valve constructed in accordance with the present invention;

Fig. 3 is a vertical sectional view through the valve illustrated in Fig. 2 and taken substantially on line 3—3 thereof, showing the relation of certain of the liquid conduits or channels;

Similar reference numerals throughout the various views indicate the same parts.

Figure 4:
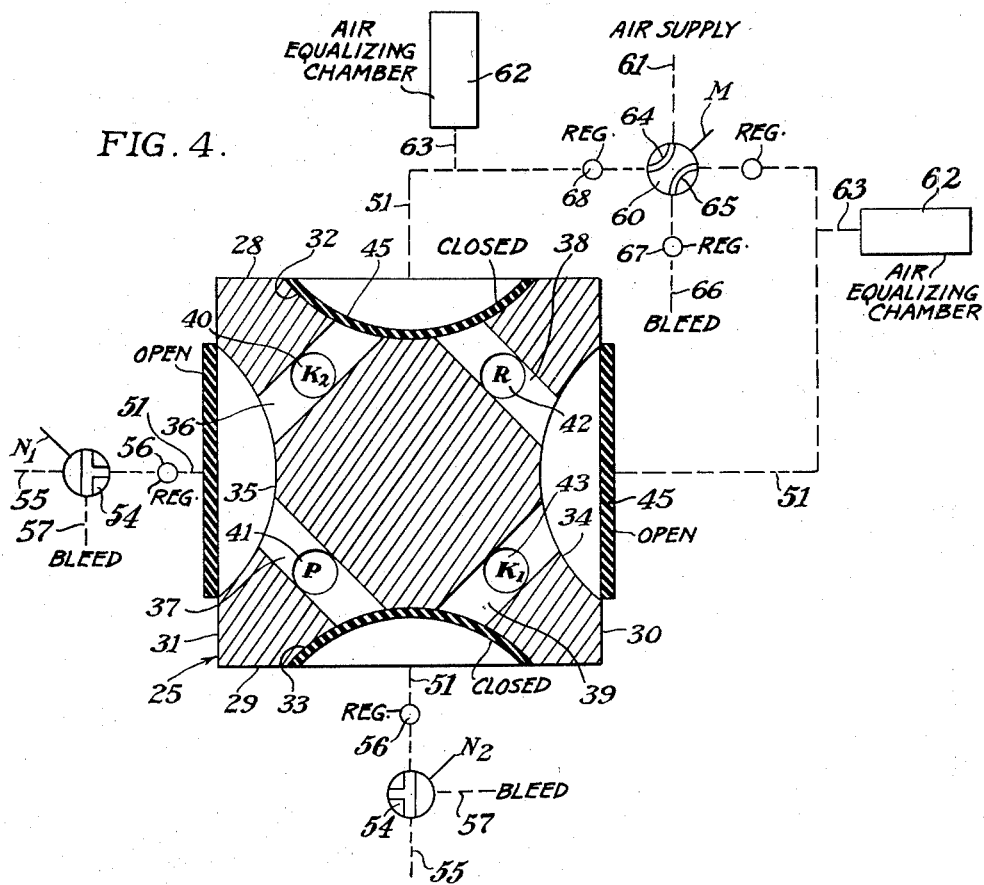
Fig. 4 is a diagrammatic arrangement of the valve illustrated in Figs. 2 and 3, showing the various airline connections thereto.

The purpose of the valve of the present invention is to facilitate certain liquid handling operations which prior to the present invention, have caused loss of time and waste products.

In order to keep the process operating continuously and thus avoid costly delays, it is necessary to have a minimum of two liquid supply kettles or containers 10, each of which contains a supply of liquid for the process. This liquid is of such composition and nature that it is necessary to prepare it in relatively small batches just prior to its use in the process. With the two supply containers the process can draw from one kettle while the other is being filled.

In the arrangement prior to this invention, each kettle was connected by a pipe to a five-port plug type valve broadly designated by the numeral 12. As this valve forms no part of the present invention further details are not deemed necessary. From the valve 12 the supply liquid was directed through a pipe 13 to a rotameter 14 and thence through pipe 15 to the chemical process in container 16. A float, not shown, in the rotameter controls an electric device 17 which in turn actuates a pinch cock or valve 20 to regulate the flow of the liquid through line 15 to the reaction kettle or container 16. As the above mechanism may be of standard or any suitable construction and forms no part of the present invention, further details are not deemed necessary.

The five-port plug type valve 12 was positioned in the line between the two supply kettles and the reaction kettle 16 as is clearly illustrated in Fig. 1. This valve was arranged so that while the liquid was flowing through one line 11 to the valve the other line could be washed out or purged of air without interfering with the operation. Each line 11 is connected through valve 12 to a purge line 19 which is normally closed by a pinch clamp 18. When it is necessary to clean out a particular line 11 and its associated kettle 10, the corresponding pinch clamp 18 is removed and the line 11 and related parts of valve 12 are cleaned or flushed out through line 19 after which clamp 18 is replaced. Such a valve permits changing from one supply line to the other without introducing air or stagnant liquid reactant, but it did not shut off one feed line before opening the other. Accordingly, the changeover resulted in severe fluctuations in liquid supply and waste in the process. The valve of the present invention, on the other hand, permits changeovers between kettles to be made without any appreciable effect on the process. It will therefore prevent some product losses and simplify the scheduling supply.

In the preferred embodiment of the present invention, as shown in Figs. 2–4, the valve is in the form of a solid block or cube of material 25, but preferably of a transparent plastic. The shape of the block will depend, of course, on the number of valve openings to be provided.

In Figs. 2–4 the block is cubical in shape and has a top 26 and a bottom 27, and four vertical sides or faces 28, 29, 30 and 31. The side faces have formed thereon partial spherical recesses 32, 33, 34, and 35. These recesses are connected by conduits 36, 37, 38 and 39, which extend through the block of plastic material, and form, in effect, a continuously rectangular conduit with the corners thereof terminating at the four faces 28, 29, 30 and 31 and in the recesses 32, 33, 34 and 35, so that a recess is formed at each corner of the rectangular conduit, as is deemed apparent from an inspection of Figs. 2–4. Thus, each recess is connected to two adjacent recesses by means of the conduits so that the recesses may all be in fluid communication. Connections are made from lines 11 to two of the conduits 36 and 39. For example, line 11 from kettle K1 is connected to conduit 39 while line 11 from kettle K2 is connected to conduit 36 which is opposite conduit 39, as best shown in Fig. 4. To secure this result, a hole or channel 43 is bored up from the bottom 27 of cube 25 to intersect conduit 39, and the outer end of this channel 43 may be counterbored and threaded so that it may be connected to the line 11 from kettle K1. Also, a similar hole or channel 40 is bored up from the bottom 27 and intersects conduit 36 and the outer end of the channel 40 may be counterbored and threaded so as to be connected to line 11 in kettle 2. Thus, in Fig. 4, the channels from the two kettles are designated K1 and K2 for purpose of clarity only. Thus, both lines 11 of the two kettles K1 and K2 are connected to opposite legs 39 and 36 of the rectangular conduit, all as clearly shown in Fig. 4. In addition, a third hole or channel 42 is bored down from the top 26 and intersects conduit 38 between recesses 32 and 34, shown in Fig. 4. The outer end of this channel 42 may be counterbored and threaded for connection to pipe 13 and the rotometer. For this reason, channel 42 in Fig. 4 is designated by the letter R. Finally, a fourth opening 41 is bored up from the bottom 27 and intersects conduit 37. The outer end of this opening is counterbored and threaded so it may be connected to a suitable disposal line or pipe. For this reason, the opening 41 in Fig. 4 is designated by the letter P to indicate a purge connection.

Thus, the two inlet lines from kettles K1 and K2 are connected to the opposite legs 39 and 36 of the rectangular conduit and channel 43 is positioned between recesses 33 and 34, while channel 40 is positioned between recesses 32 and 35. Also, conduit 42 is positioned between recesses 32 and 34 and between channels 40 and 43 while conduit 41 is positioned between recesses 35 and 33 and between channels 40 and 43. Fig. 4 shows more clearly the relation of the various recesses and their connecting conduits and channels, and the relation of these various conduits and channels to the kettles K1 and K2, the rotometer and the purge lines.

Figure 8:
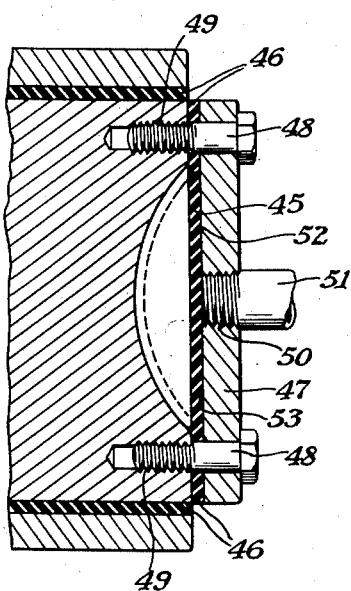
Fig. 8 is a partial sectional view through a valve of the type of the present invention, showing the arrangement of one of the spherical recesses and the flexible diaphragm associated therewith.

Each face 28 to 31 of the valve block 25 has positioned thereon a flexible member in the form of a rubber diaphragm 45 which overlies the recesses formed on the valve face. The edges 46 of each diaphragm extend beyond the recess, as shown in Fig. 8, and are held against the valve face by means of a rigid or metal plate 47 which is screwed to the valve face by screws 48 or other fastening means which pass through a plate 47 and are received in tapped holes 49 formed in the valve block 25, as best shown in Fig. 8. A diaphragm overlies each of the four faces 28, 29, 30 and 31, and the associated plate 47 is provided with a threaded opening 50 in which is threaded pipe 51 connected to a suitable source of fluid pressure, such as compressed air. It will be apparent from an inspection of Fig. 4, that if a fluid pressure is applied through pipe 51, pressure will be exerted on the outer surface 52 of the diaphragm to force the latter inwardly from a flat form, as shown at the top and bottom of Fig. 4. It will also be apparent that when a diaphragm is pressed in, communication is cut off between adjacent recesses, as, for example, line 40 is cut off from line 42. However, when pressure is released from the diaphragm, as will be later pointed out, the diaphragm, due to its flexible nature, will move upwardly to the flat or released position as shown at the left and right sides of Fig. 4.

Pressure lines 51 of the lower and left hand diaphragms of Fig. 4 are each connected through a valve 54 to a pressure line 55. The left and lower valves 54, Fig. 4, are provided with handles N1 and N2, respectively, which will be later more fully described. Also, each line 51 of a valve 54 is provided with an adjustable or regulating member 56 which is provided with a small apertured plate, not shown, which controls the rate of flow of the fluid, such as air, to and from the associated diaphragm. The valves 54 are provided with three ports so that either of the valves for the lower and left hand diaphragms can be connected selectively to the airline or to the bleed-off line. When the handles N1 and N2 are in one position, air is supplied from airlines 55 through valves 54 and regulators 56 to the lower and left diaphragm 45 to move these diaphragms inwardly against the recesses. However, when the valves N1 and N2 are moved to another position, the lines 51 of the lower and left diaphragms are connected to bleed-offs 57 which bleed off the air above the diaphragms to permit the latter to return to their flat positions. Thus, the left and lower diaphragms of Fig. 4 are separately and independently controlled for reasons to be later described.

Referring again to Fig. 4, the two lines 51 of the top and right diaphragh 45 are both connected through a valve 60 which, in turn, is connected to a fluid pressure line such as compressed airline 61. Each line 51 of the top and right diaphragms is also provided with a surge chamber 62 connected to the associated line 51 by a pipe 63. The valve 60 is provided with an operating handle M. Referring to Fig. 4 it is seen that valve 60 is provided with two curved ports 64 and 65 which connect the line 61 to the top lines 51, as shown at the top, or to the bleeder line 66 shown at the bottom. A regulator 67 is provided with an apertured plate positioned in line 66 to control the rate of bleed off.

The above-described valve operates as follows: Assume now that the supply liquid is to be fed from kettle K1. The valve 60 is turned to the position shown in Fig. 4 so that the curved port 64 will connect airline 61 to top pipe 51 for the top diaphragm 45 to apply air pressure to the latter. This pressure will force the upper diaphragm down and into tight engagement with the bottom of the top recesses 32 to cut off communication between channel 40 (K2) and channel 42 (R). On the other hand, the curved port 65 will be positioned to connect line 51 from the right diaphragm overlying recess 34 to bleed line 66 to release the pressure over the right diaphragm, and the latter moves out of recess 34 to connect pipe 43 (K1) to channel 42 (R) so that the supply liquid will flow from the kettle K1 through valve 25 to the rotometer 14 and hence to the process. In order to prevent material from passing channel 43 (K1) through recess 33 to channel 41 (P) the diaphragm 45 of the lower recess 33 is closed off, as shown in Fig. 4 by adjusting the handle N2 of the lower valve 54 to connect this lower valve with the airline. Thus, by closing the top and bottom recesses and opening the right recess, the supply liquid will flow through channel 43 to channel 42 and thus through to the rotometer. While the liquid is being supplied from kettle K1, it may be desirable to clean the line from kettle K2. To secure this result, the handle N1 is turned to adjust the left valve 54 to connect line 51 from the left recess to the bleed line 57 to relieve the pressure on the left diaphragm. The rate of bleeding will be controlled by the left hand regulator 56. When the left diaphragm has been moved to the position shown in Fig. 4, the line 11 and channel 40 from kettle K2 are connected through the left recess 35 to the purge line 41 (P). Thus, from an inspection of Fig. 4 it will be seen that the kettle K1 is connected to the rotometer line R while the kettle K2 is connected to the purge line P. After the kettle K2 and its associated line has been cleaned completely and purged of air, the valve 54 of the left diaphragm is turned by means of handle N1 to connect the left line 51 to the left air supply line 55. This serves to apply air pressure to the left diaphragm to move the latter into the left recess 35 and cut off channel 40 and hence kettle K2 from the purge line 41. The clean kettle K2 can then be filled with a new supply of liquid.

After filling kettle K2 with the supply liquid line 11 and channel 40 from kettle K2 are connected through the left recess 35 to the purge line 41 (P) in the manner as previously described, thus permitting supply liquid to purge line 11 and channels 40 and 36 of air and cleaning liquid. When purging is completed flow from kettle K2 to purge (41) is cut off by means of the left diaphragm as previously described.

When the kettle K1, which supplies the liquid to the process 16, reaches a predetermined level, the valve 25 is operated to switch from K1 to K2. To secure this result, the handle M of valve 60 is rotated counterclockwise 90° to bring the curved port 64 into position to connect the left line 51 to the upper diaphragm with the bleeding line 66 simultaneously to move curved port 65 to connect line 51 of the right diaphragm to line 61. This adjustment of valve 60 will serve to apply air pressure to the right diaphragm to move the latter into the right recess 34 to cut off communication between channel 43 to kettle K1 and channel 42 to the rotometer. At the same time the air pressure which held the top diaphragm down is bled off through an upper line 51 and the bleeder line 66 and the upper diaphragm 45 moves out of recess 32 to connect channel 40 (K2) to channel 42 (R) so the composition will now be supplied from kettle K2 to the rotometer. Because of restricting orifices of the regulators 67 and 68, and the volumes of chambers 62, the air pressure is built up and bled off slowly from the right and top diaphragms, respectively, so the transition takes about twelve to fifteen seconds. The result is the rotometer has sufficient time to compensate for the tendency toward higher flow rate from the full kettle. In this way, the changeover can be made without appreciably affecting the process. Also, the air equalizing chambers 62 further cushion the air and prevent any sudden change in flow during the changeover.

Figure 5:
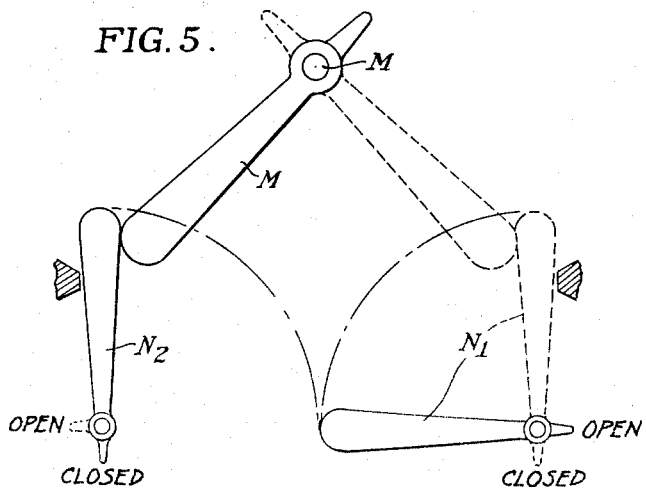
Fig. 5 is a diagrammatic view of the valve operating handles, showing the interlock arrangement therebetween.

It will be apparent from an inspection of Fig. 4 that if both the lower and the left diaphragms 45 are moved to open position, the line from both kettles K1 and K2 will be connected to the purge line 41, the disadvantages of which are deemed apparent. Therefore, in order to prevent such an occurrence and to allow only one kettle at a time to be connected to the purge line 41, a special interlock, see Fig. 5, is provided between the handle M of the valve 60 and handles N1 and N2 of the left and bottom valves 54. It will be apparent from an inspection of Fig. 5 that when handle M is in the full line position, the valve handle N2 will be held in closed position. However, handle N1 can be moved to open position, as shown in the full lines Fig. 5. On the other hand, when the handle M is in the dotted line position, the handle N1 will be locked in closed position while handle N2 can be moved to open position. Thus, handle M allows only one of the handles N1 or N2 to be moved to open position, thus preventing both diaphragms from being open or closed at the same time. To secure this interlocked relation, the pipes in which the various valves are positioned actually are arranged in the manner shown in Fig. 5. Fig. 4 is merely a diagrammatic arrangement of the parts of the valves and the various control lines and valves therefor.

While the above-described diaphragm valve 25 is described primarily for use in supplying and controlling a liquid from a pair of supply containers or kettles, it also has several other advantages. Compared to the prior 5-port plug-type valve, the valve of the present invention is simpler in construction and much less expensive to manufacture. Also, the 5-port valve requires a greater amount of maintenance than the valve of the present invention. Furthermore, the present diaphragm type of valve is easier to clean. This last feature is particularly important when certain compositions are handled. Also, the valve of the present invention could be arranged for remote control. It is apparent that while the valve so far described is designed for a particular application, it can be used in any applications in which a multi-port valve is desirable. The opening and closing of the valves can be performed by any suitable fluid pressure means, and the opening and closing of the valves can be timed in any desired manner.

Usually the purging feature is not required in multi-port valves, the principal requirement being the ability to switch from any one of two or more feed lines to a common discharge. The number of ports which could be incorporated is unlimited since it depends only upon the number of diaphragm connections which can be connected with the common discharge port.

Figure 6:
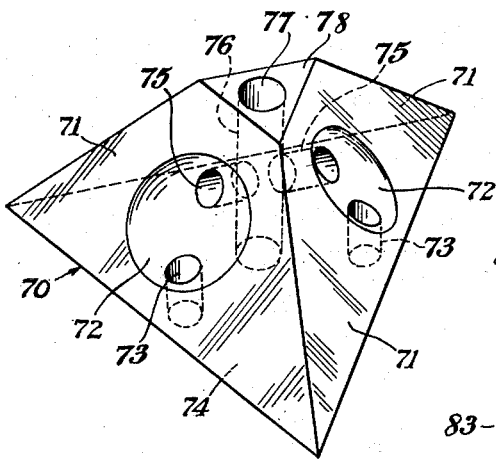
Fig. 6 is a perspective view of a modified type of diaphragm control valve.

Fig. 6 shows a modified arrangement in which the valve body 70 is triangular in shape to provide three sides 71, two sides of which are formed to provide a partial spherical cavity or recess 72. A pair of inlet channels 73 extends up from the base of the valve body to the respective recesses. Outlet channels 75 connect the recesses 72 to a main outlet conduit 76 which extends through a valve body and has an opening 77 on any desired face thereof, such as base 74 or top 78. Of course, a third recess could be provided on the other face of the valve body.

Figure 7:
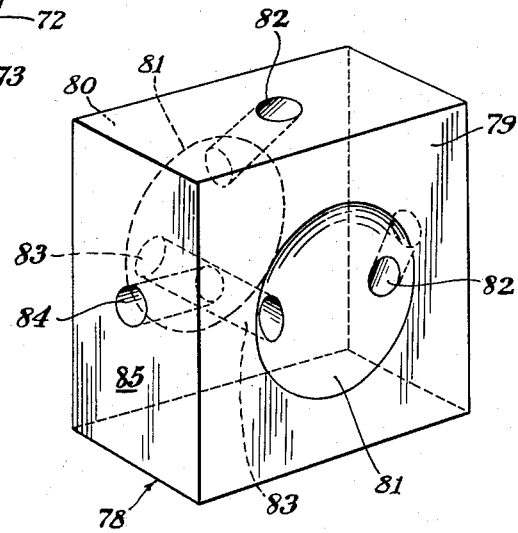
Fig. 7 is a perspective view of a still further modification of the valve of the present invention.

Fig. 7 shows still another modification in which the valve body 78 is in the form of a solid block, preferably transparent, the opposite faces 79 and 80 of which are formed to provide recesses 81. Each recess may be connected by an inlet chamber 82 to a face of the block and also each recess 81 is connected by an outlet chamber 83 to conduit 84, which extends from channels 83 to a face 85 of the valve body 78. The particular faces in which the recess inlet lines and discharge lines are formed is a matter of choice. Also, while only two valve openings have been provided, it is apparent that additional valve openings may be supplied on other faces of the block.

The present invention thus provides a new and improved multi-port diaphragm valve by which a liquid material can be supplied from a source of supply chambers or kettles to a single point of use. Also, the valve enables changes to be made from one source to the other without appreciably affecting the rate of flow at the point of use. The valve is simple in structure, comprises few parts of rugged construction, easy to clean, simple to operate and highly effective in use.

While certain embodiments of the invention have been disclosed, it is apparent that the inventive idea may be carried out in a number of ways. Therefore, this application is to be limited only insofar as necessitated by the prior art and the scope of the appended claims.

What I claim and desire to secure by Letters Patent of the United States is:

1. A multi-diaphragm valve comprising, in combination, a solid one-piece multi-face transparent body portion, said portion having a rectangular channel formed therein the corners of said channel terminating at four faces positioned in different planes of said portion, each of said four faces having a partial spherical recess formed therein and connecting adjacent legs of said channel, said portion having formed therein separate inlet channels separately connected to opposite legs of said rectangular channel and terminating in a face of said portion, said portion having formed therein an outlet channel connected to one leg of said rectangular channel intermediate said opposite legs and terminating in a face of said portion, the latter also having formed therein a purge channel connected to the leg of said first channel opposite that connected to said outlet channel, a flexible diaphragm overlying each recess, means simultaneously to move the diaphragms of the recesses between said inlet channels and said outlet channel to connect one inlet channel to and to disconnect the other inlet channel from said outlet channel, and means to move the diaphragms between said inlet channels and said purge channel to disconnect said one inlet channel from and to connect the other inlet channel to said purge channel.

2. A multi-diaphragm valve comprising, in combination, a solid multi-face body portion, said portion having formed therein a rectangular channel the corners of which terminate substantially at four faces positioned in different planes of said portion, said portion having on said four faces partial spherical recesses connected to said channel, said portion having formed therein an outlet channel extending from a face of said portion to a side of said rectangular channel between adjacent recesses, said portion having formed therein a purge channel extending from a face of said portion to a side of said rectangular channel opposite said outlet channel and between other adjacent recesses, said portion having formed therein a pair of oppositely disposed inlet channels which extend from faces of said portion to the other opposite sides of said rectangular channel between said outlet channel and said purge channel, a flexible diaphragm overlying each recess, fluid pressure lines connected to the diaphragms of said first adjacent recesses, a fluid pressure supply line connected to said fluid line, a valve in said supply line movable to apply fluid pressure to one of said fluid lines and to bleed the other fluid line to move the diaphragms of said first adjacent recesses to open position to connect one of the inlet channels to said outlet channel and simultaneously to move the diaphragm to the other first adjacent recesses into its recess to disconnect the other inlet channel from the outlet channel, a fluid pressure line connected to another diaphragm for moving the diaphragm to and from closing relation with its recess to connect and disconnect one inlet channel to and from said purge channel, and a fluid pressure line connected to another diaphragm for moving the last diaphragm to and from recess closing position to connect the other inlet channel to and to disconnect it from the purge channel.

3. A multi-diaphragm valve comprising, in combination, a multi-face body portion formed with partial spherical recesses on four different faces thereof, said body portion being formed with separate discharge conduits connected to opposite pairs of recesses, said body portion formed with separate inlet conduits connected to other pairs of recesses, each discharge conduit being connectable to either of said inlet conduits, a flexible diaphragm overlying each recess and being movable thereinto to disconnect an inlet conduit from an outlet conduit, a fluid pressure line connected to each of said diaphragms to move the latter selectively into said recesses, bleeding means on said lines for bleeding the latter to permit the diaphragms to move out of said recesses, a separate valve on each of two of said lines, an operating handle for each valve, a fluid supply line, a valve for connecting said supply line selectively to one of the two other pressure lines, and an operating handle for said last valve, said last handle being positioned relative to said other handles so as to provide an interlock arrangement by which only one of said first handles can be moved to open its valve when said last handle is positioned to connect said supply line to one of said two pressure lines.

4. A multi-diaphragm valve comprising, in combination, a solid multi-face body portion, said portion having formed therein a rectangular channel the corners of which terminate substantially at four faces positioned in different planes of said portion, said portion having on said four faces partial spherical recesses connected to said channel, said portion having formed therein an outlet channel extending from a face of said portion to a side of said rectangular channel between adjacent recesses, said portion having formed therein a purge channel extending from a face of said portion to a side of said rectangular channel opposite said outlet channel and between other adjacent recesses, said portion having formed therein a pair of oppositely disposed inlet channels which extend from faces of said portion to the other opposite sides of said rectangular channel between said outlet channel and said purge channel, a flexible diaphragm overlying each recess, fluid pressure lines connected to the diaphragms of said first adjacent recesses, a supply line connected to said fluid line, a valve in said supply line movable to apply fluid pressure to one of said fluid lines and to bleed the other fluid line to move one of the diaphragms of said first adjacent recesses to open position to connect one of the inlet channels to said outlet channel and simultaneously to move the diaphragm to the other first adjacent recesses into its recess to disconnect the other inlet channel from the outlet channel, a fluid pressure line connected to another diaphragm for moving the diaphragm to and from closing relation with its recess to connect and disconnect one inlet channel to and from said purge channel, a valve in said last pressure line, a fluid pressure line connected to another diaphragm from moving the latter to and from recess closing position to connect the other inlet channel to and to disconnect it from the purge channel, and handles for operating said valves, said handles being positioned relative to each other to provide an interlock which permits the valves to be operated only in a definite order.

References Cited in the file of this patent
UNITED STATES PATENTS

| | | |
|---|---|---|
| 1,441,088 | Hofstetter | Jan. 2, 1923 |
| 1,844,853 | Hodgson | Feb. 9, 1932 |
| 2,180,320 | Hansen | Nov. 14, 1939 |
| 2,352,629 | Griswold | July 4, 1944 |
| 2,376,918 | Hughes | May 29, 1945 |
| 2,545,857 | Perkins | May 20, 1951 |
| 2,582,088 | Walthers | Jan. 8, 1952 |
| 2,612,185 | Allen | Sept. 30, 1952 |
| 2,634,751 | Borer | Apr. 14, 1953 |
| 2,677,390 | Davis | May 4, 1954 |

UNITED STATES PATENT OFFICE
CERTIFICATE OF CORRECTION

Patent No. 2,865,402                                          December 23, 1958

Frank D. Miller

It is hereby certified that error appears in the printed specification of the above numbered patent requiring correction and that the said Letters Patent should read as corrected below.

Column 4, line 9, for "diaphragh" read -- diaphragm --; column 6, line 56, for "first" read -- rectangular --.

Signed and sealed this 21st day of April 1959.

(SEAL)
Attest:
KARL H. AXLINE                                                              ROBERT C. WATSON

Attesting Officer                                                         Commissioner of Patents